(12) United States Patent
Contopanagos et al.

(10) Patent No.: US 6,979,608 B2
(45) Date of Patent: Dec. 27, 2005

(54) METHOD OF MANUFACTURING AN ON-CHIP INDUCTOR HAVING IMPROVED QUALITY FACTOR

(75) Inventors: Harry Contopanagos, Santa Monica, CA (US); Christos Komninakis, Los Angeles, CA (US); Sissy Kyriazidou, Santa Monica, CA (US)

(73) Assignee: Broadcom, Corp., Irvine, CA (US)

( * ) Notice: Subject to any disclaimer, the term of this patent is extended or adjusted under 35 U.S.C. 154(b) by 0 days.

(21) Appl. No.: 10/673,874

(22) Filed: Sep. 29, 2003

(65) Prior Publication Data

US 2004/0087099 A1   May 6, 2004

Related U.S. Application Data

(62) Division of application No. 10/074,293, filed on Feb. 12, 2002, now abandoned.

(51) Int. Cl.[7] ............... H01L 21/8238; H01L 21/8234; H01L 21/8244; H01L 21/20
(52) U.S. Cl. ................. 438/210; 438/238; 438/381
(58) Field of Search ............... 438/210, 238, 438/381; 257/528, 531

(56) References Cited

U.S. PATENT DOCUMENTS 4,713,711 A * 12/1987 Jones et al. ............... 360/123
6,133,079 A * 10/2000 Zhu et al. ............... 438/210
6,455,915 B1 * 9/2002 Wong ........................ 257/531

OTHER PUBLICATIONS

"Progress in RF Inductors on Silicon—Understanding Substrate Losses" by Joachim N. Burghartz—IBM Research Division, T. J. Watson Research Center, P. O. Box 218, Yorktown Heights, New York 10598 USA.

IEEE Journal of Solid-State Circuits, vol. 33, No. 5, May 1998—the "Stanford Paper"—On-Chip Spiral Inductors With Patterned Ground Shields for Si-Based RF IC's —C. Patrick Yue, Student Member, IEEE, and S. Simon Wong, Senior Member, IEEE.

* cited by examiner

*Primary Examiner*—William M. Brewster
(74) *Attorney, Agent, or Firm*—Garlick, Harrison & Markison LLP; Timothy W. Markison (57) ABSTRACT

An on-chip inductor may be fabricated by creating at least one dielectric layer, creating at least one conductive winding on the at least one dielectric layer and creating: (1) a P-well layer having a major surface parallel to a major surface of the dielectric layer, (2) field oxide layer having a major surface parallel to a major surface of the dielectric layer, (3) P-well and field oxide layer, or (4) a poly-silicon layer having a major surface parallel to a major surface of the dielectric layer.

8 Claims, 8 Drawing Sheets

FIG. 1A
top view

FIG. 1B
side view

FIG. 2A
top view

FIG. 2B
side view

FIG. 3A
top view

FIG. 3B
side view

FIG. 4A top view

FIG. 4B side view

FIG. 5 differential inductor 60
FIG. 6A
top view

FIG. 6B
side view

FIG. 8A
top view

FIG. 8B
side view

FIG. 9

METHOD OF MANUFACTURING AN ON-CHIP INDUCTOR HAVING IMPROVED QUALITY FACTOR

This patent application is claiming priority under 35 USC § 120 & 121 as a divisional patent application to patent application entitled ON-CHIP INDUCTOR HAVING IMPROVED QUALITY FACTOR AND METHOD OF MANUFACTURE THEREOF, having a filing date of Feb. 12, 2002, now abandoned, and a Ser. No. of 10/074,293.

TECHNICAL FIELD OF THE INVENTION

This invention relates generally to integrated circuits and more particularly to on-chip inductors.

BACKGROUND OF THE INVENTION

Integrated circuits (IC's) are known to include a substrate, one or more dielectric layers on the substrate, and one or more metal layers supported by a corresponding dielectric layer. The metal layers are fabricated in such a way to produce on-chip components such as resistors, transistors, capacitors, inductors, et cetera. How an on-chip component is fabricated, as well as the number of dielectric layers and metal layers, minimum and maximum metal track sizes, and spacing between metal tracks, are dictated by the technology used and corresponding foundry rules governing the fabrication of integrated circuits using such technology.

For example, CMOS technology is readily used for cost effective integrated circuits. Foundries that manufacture CMOS integrated circuits provide rules governing the number of dielectric layers and metal layers, minimum and maximum metal track sizes, spacing between the metal tracks, fabrication options, and other aspects of integrated circuit production. The fabrication options include adding a P-well layer, adding a field oxide layer, adding a poly-shield, et cetera.

It has become conventional wisdom, (i.e., a de-facto standard) among on-chip inductor designers that the quality factor (i.e., the measure of a component's, or circuit's, ability to provide a large output at resonant frequency and the frequency selectivity of the component or circuit) is maximized by including a poly-shield with a P-well layer and a field oxide layer. By designing 8 to 10 nano Henry on-chip inductor in accordance with conventional wisdom, a quality factor of about 8.07 to 8.70 can be obtained at 2.4 gigahertz. While such inductors may be acceptable for some applications, improving the quality factor of on-chip inductors improves performance in such applications and allows on-chip inductors to be used in many other applications currently beyond the reach of conventional on-chip inductors.

Therefore, a need exists for an on-chip inductor that has an improved quality factor with respect to current on-chip inductors and a need exists for a method of manufacture thereof.

SUMMARY OF THE INVENTION

The on-chip inductor disclosed herein substantially meets these needs and others. An on-chip inductor, in accordance with the present invention, consists of at least one dielectric layer, at least one conductive winding on the at least one dielectric layer and a P-well layer having a major surface that is parallel to a major surface of the dielectric layer. The on-chip inductor may be expanded to include a plurality of conductive windings on one or more dielectric layers. In addition, the on-chip inductor may be expanded to further include a field oxide layer. In addition, the on-chip inductor may include a center tap to produce a differential inductor and/or may include a $2^{nd}$ winding to produce an on-chip transformer. The on-chip inductor, however, does not include a poly-shield.

An alternate embodiment of an on-chip inductor includes at least one dielectric layer, at least one conductive winding on the at least on dielectric layer and a field oxide layer that has a major surface parallel with the major surface of the dielectric layer. In this embodiment, the on-chip inductor may be expanded to include a P-well layer. In addition, the conductive winding may include several turns per layer and may include several layers. In addition, the on-chip inductor may include a center tap to produce a differential inductor and/or may include a $2^{nd}$ winding to produce an on-chip transformer. The on-chip inductor, however, does not include a poly-shield.

In another embodiment of an on-chip inductor in accordance with the present invention, the on-chip inductor includes at least one dielectric layer, at least one conductive winding on the at least one dielectric layer and a poly silicon layer (i.e., a poly shield layer) that has a major surface that is parallel to the major surface of the dielectric layer. In this embodiment of the on-chip inductor, the on-chip inductor does not include a P-well layer or a field oxide layer. As with the other embodiments, the on-chip inductor may be expanded to include a $2^{nd}$ winding to produce an on-chip transformer and/or may include a center tap to produce a differential inductor.

Each of the embodiments of the on-chip inductor may be fabricated by creating at least one dielectric layer, creating at least one conductive winding on the at least one dielectric layer and creating either a P-well layer, field oxide layer or poly-silicon layer having a major surface parallel to a major surface of the dielectric layer.

DETAIL DESCRIPTION OF A PREFERRED EMBODIMENT

Figure 1A:
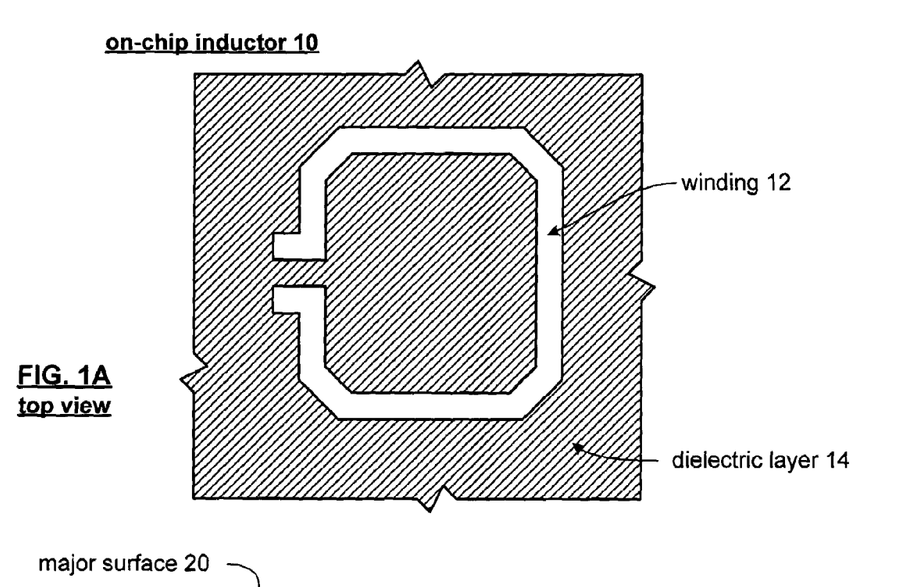
FIGS. 1A and 1B illustrate a top and side view of an on-chip inductor in accordance with the present invention.
Figure 1B:
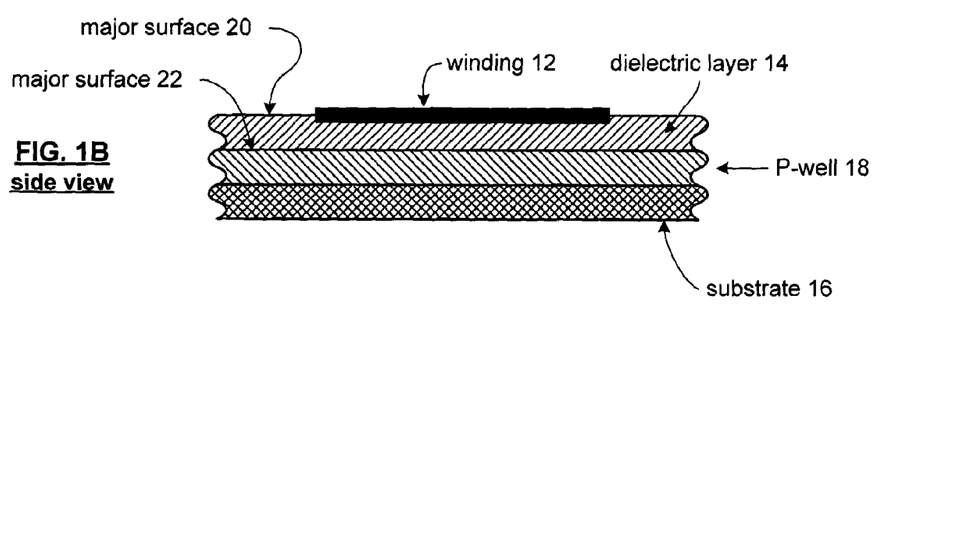

FIGS. 1A and 1B illustrate a top and side view of an on-chip inductor 10 that includes a winding 12 created on a dielectric layer 14. A P-well layer 18 and a substrate 16 support the dielectric layer 14. As shown, a major surface 20 of the dielectric layer 14 is substantially parallel to a major surface 22 of P-well 18. In this embodiment of the on-chip inductor 10, a poly silicon layer (i.e., a poly-shield) is not included. By including a P-well layer with the absence of a poly-shield, quality factors for an 8–10 nano Henry inductor at 2.4 gigahertz of at least 10, which corresponds to a Q factor improvement of at least 15% and more typically of 25% in comparison to a similar inductor having both a poly shield and a P-well.

As one of average skill in the art will appreciate, the on-chip inductor 10 of FIG. 1 as well as the other on-chip inductors and transformers described throughout the remaining figures, may be implemented using CMOS technology, gallium arsenide, silicon germanium, or any other type of technology used to implement integrated circuits.

Figure 2A:
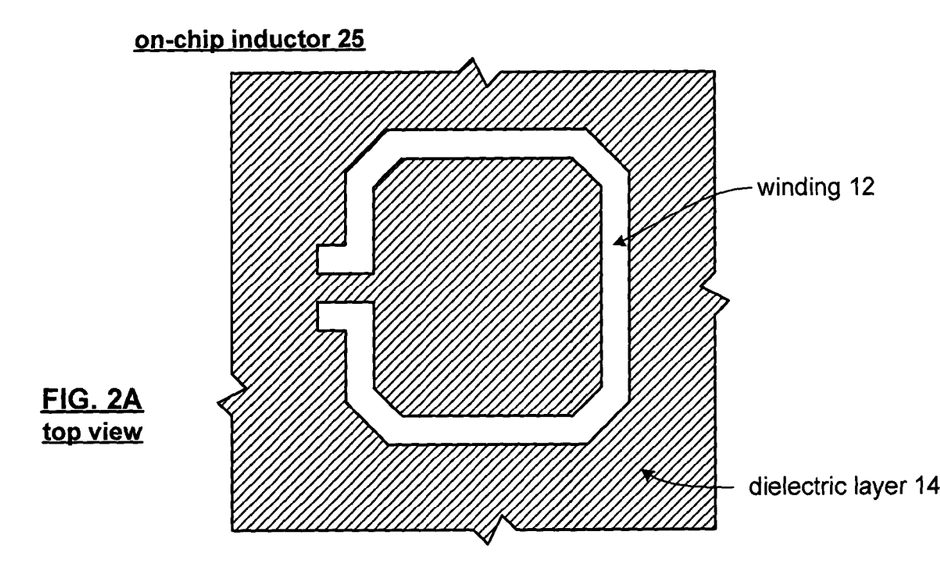
FIGS. 2A and 2B illustrate an alternate embodiment of an on-chip inductor in accordance with the present invention.
Figure 2B:
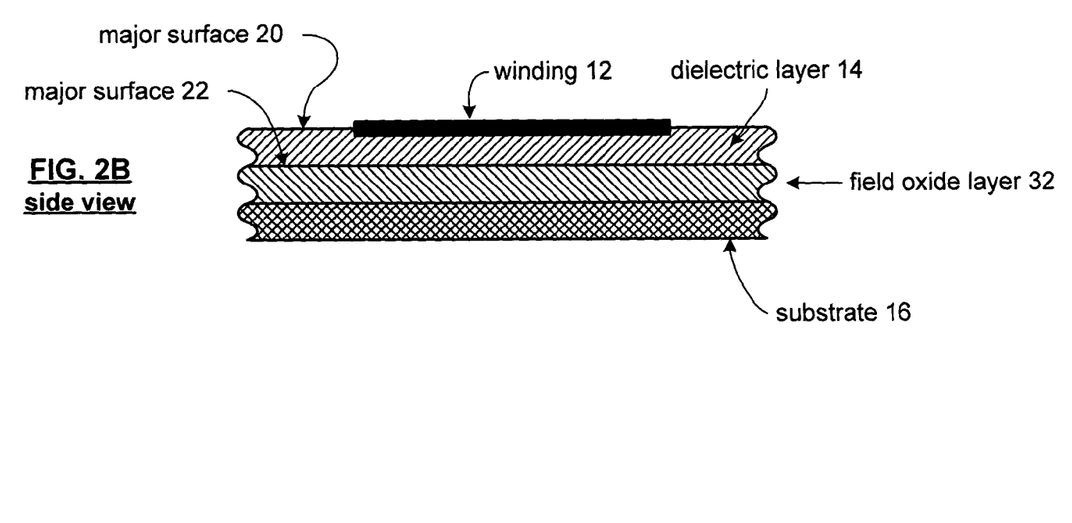

FIGS. 2A and 2B illustrate a top and side view of on-chip inductor 25 that includes winding 12 created on dielectric layer 14. The dielectric layer 14 is supported by a field oxide layer 32 and substrate 16. Major surface of dielectric layer 14 is parallel to major surface 22 of field oxide layer 32. In this embodiment of on-chip inductor 25, a poly-silicon layer is not included. As with the inclusion of a P-well layer with the exclusion of a poly-silicon, the inclusion of a field oxide layer with the exclusion of a poly-silicon, improves the quality factor by at least 15% in comparison to including both.

Figures 3A, 3B:
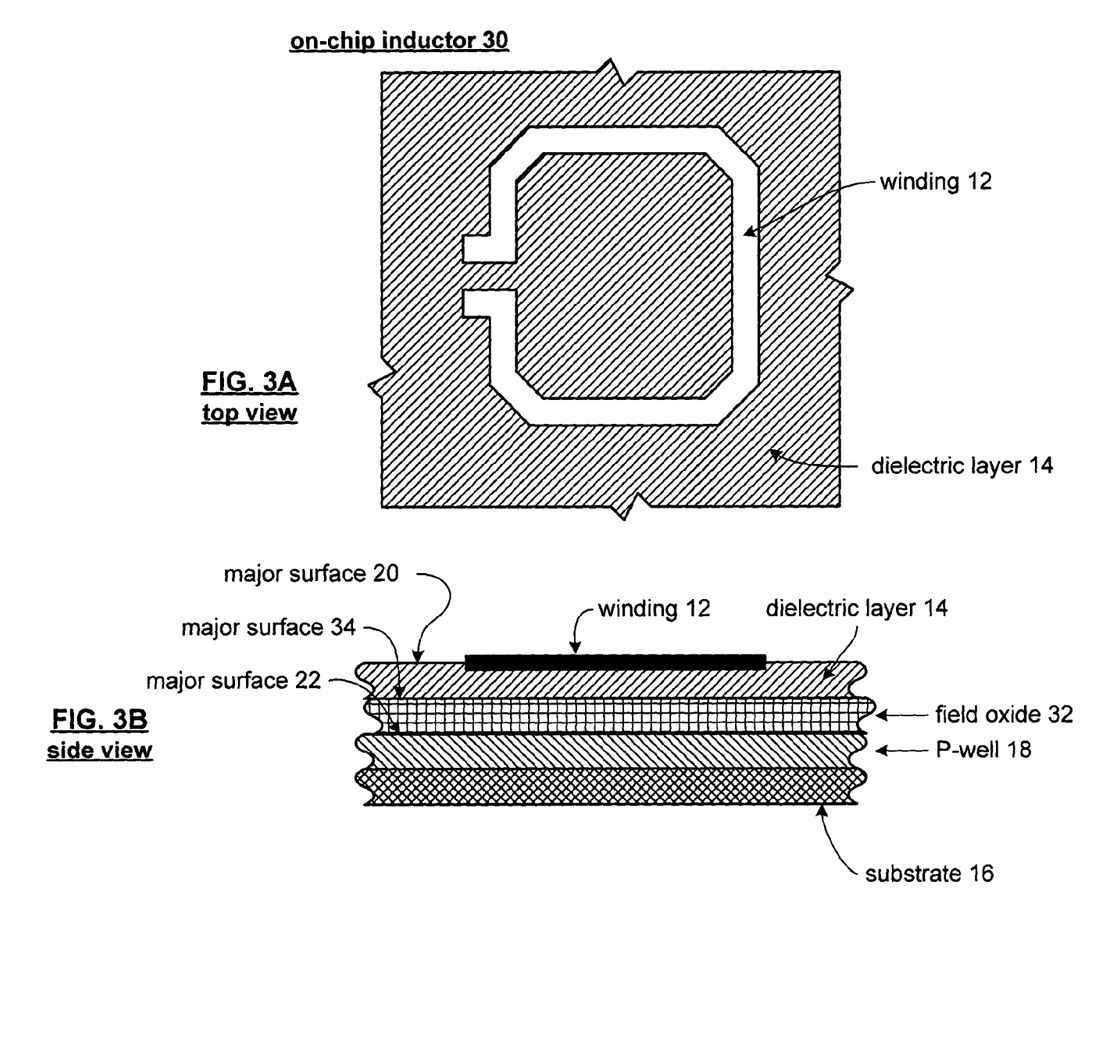
FIGS. 3A and 3B illustrate another embodiment of an on-chip inductor in accordance with the present invention.

FIGS. 3A and 3B illustrate a top and side view of on-chip inductor 30 that includes winding 12 created on dielectric layer 14. Dielectric layer 14 is supported by a field oxide layer 32, a P-well layer 18 and substrate 16. A major surface 30 of dielectric layer 14 is parallel to major surface 34, a field oxide layer 32 and major surface 22 of P-well 18. In this embodiment of the on-chip inductor 30, a field oxide layer 32 and P-well layer are included but a poly-silicon layer is omitted. By including both a P-well layer and field oxide layer as opposed to including only one of the layers, the quality factor is further increased in comparison to including the poly shield with the P-well and field oxide layer.

Figure 4A:
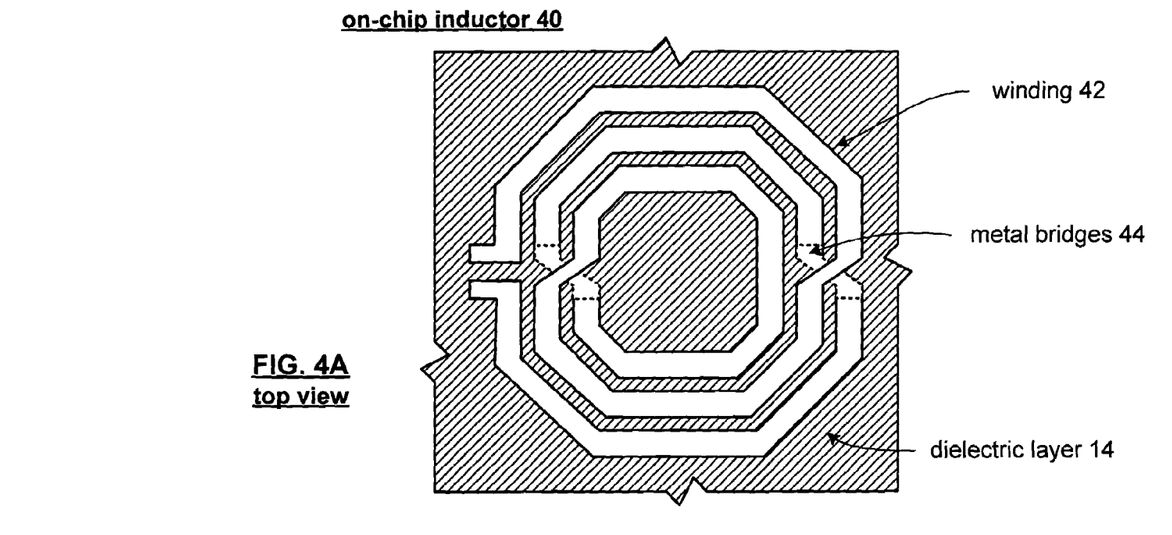
FIGS. 4A and 4B illustrate yet another embodiment of an on-chip inductor in accordance with the present invention.
Figure 4B:
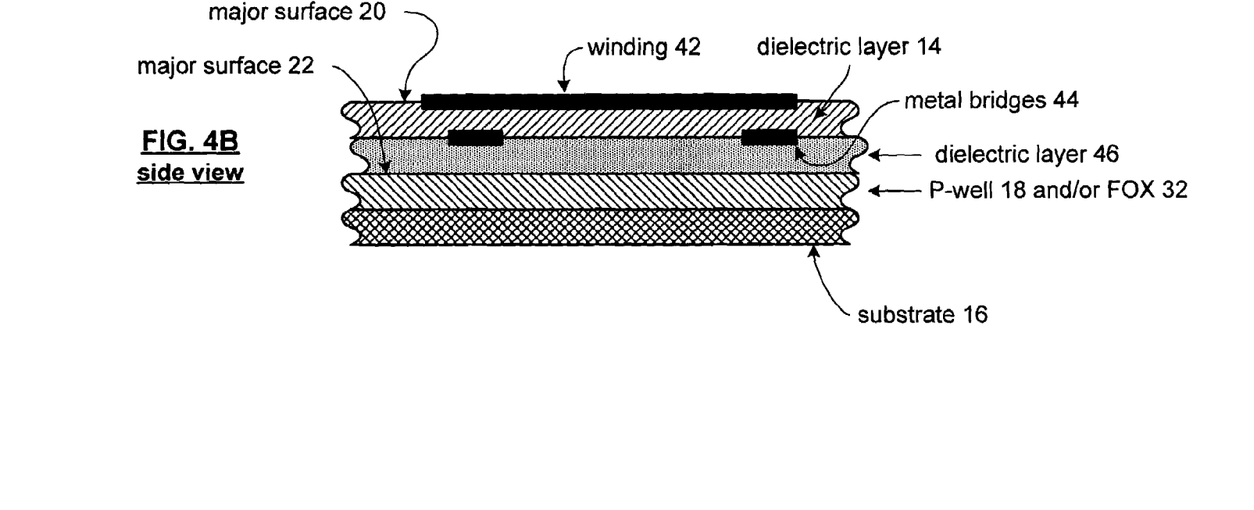

FIGS. 4A and 4B illustrate an on-chip inductor 40 that includes a spiral winding 42, metal bridges 44, dielectric layer 14, and dielectric layer 46. The spiral winding 42 is created on dielectric layer 14 while the metal bridges 44 are created on dielectric layer 46. The on-chip inductor 40 may include a P-well layer 18 and/or a field oxide layer 32. The entire structure is supported by substrate 16. The major surfaces of the dielectric layer 14 are substantially parallel to the major surfaces of the P-well 18 and/or field oxide layer 32. The on-chip inductor 40, however, does not include a poly-shield.

Figure 5:
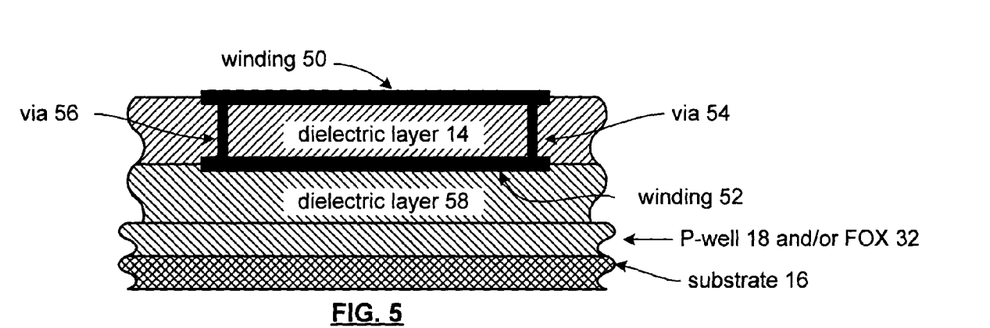
FIG. 5 illustrates a further embodiment of an on-chip inductor in accordance with the present invention.

FIG. 5 illustrates a side view of an on-chip inductor that has windings 50 and 52 on multiple dielectric layers 12, 14 and 58. The on-chip inductor further includes a P-well layer 18 and/or a field oxide layer 32 supported by substrate 16. Windings 50 and 52 may be single windings or spiral windings and may be connected in serial or parallel fashion. The on-chip inductor, however, does not include a poly-shield.

Figure 6A:
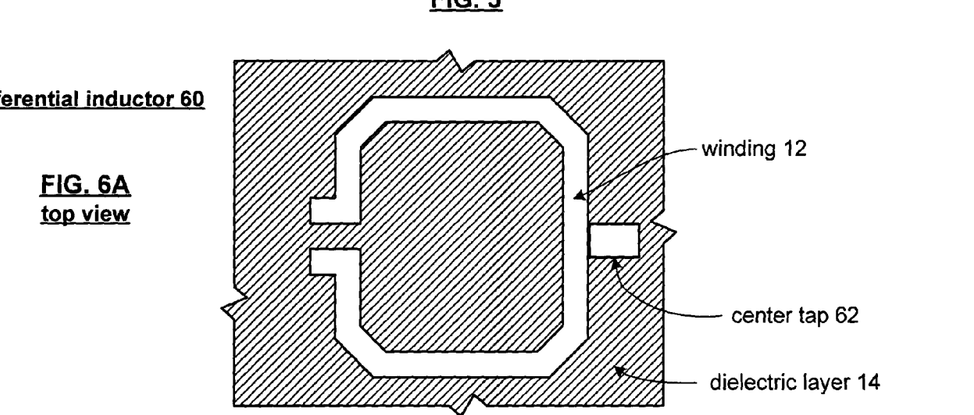
FIGS. 6A and 6B illustrate a differential inductor in accordance with the present invention.
Figure 6B:
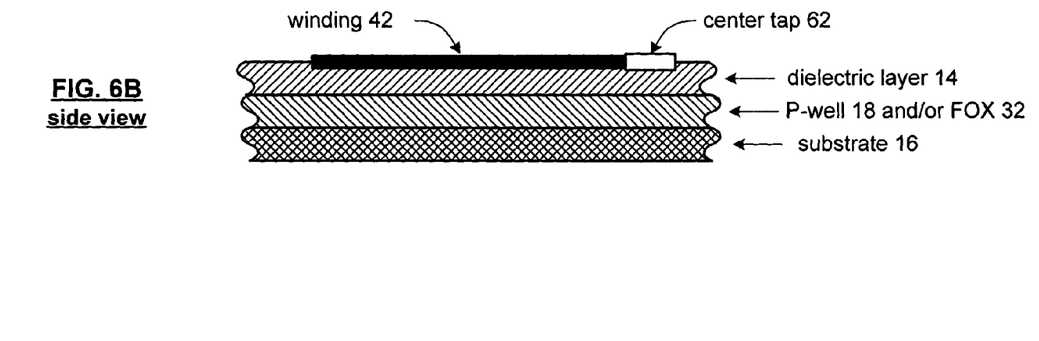

FIGS. 6A and 6B illustrate a top and side view of a differential inductor 60 that includes winding 12, center tap 62 created on dielectric layer 14. The differential inductor 60 also includes a P-well layer 18 and/or a field oxide layer 32 that is supported by substrate 16. Note that the winding 12 may include one or more turns on one or more dielectric layers. Further note that the differential inductor 60 does not include a poly-silicon.

Figure 7A:
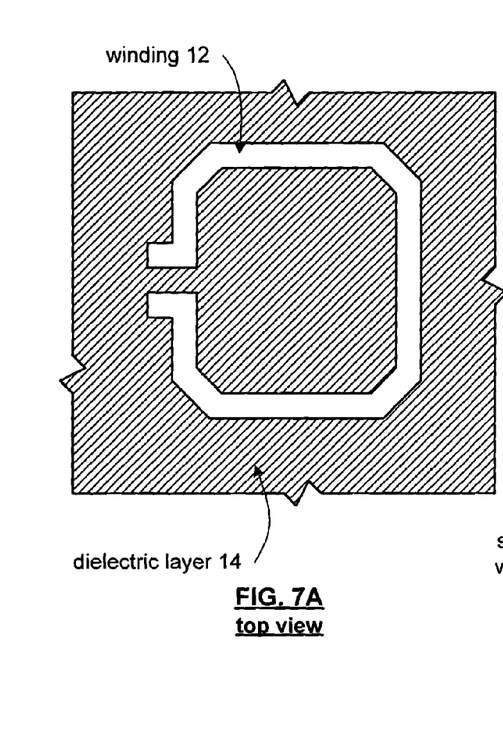
FIGS. 7A–7C illustrate an on-chip transformer in accordance with the present invention.
Figures 7B, 7C:
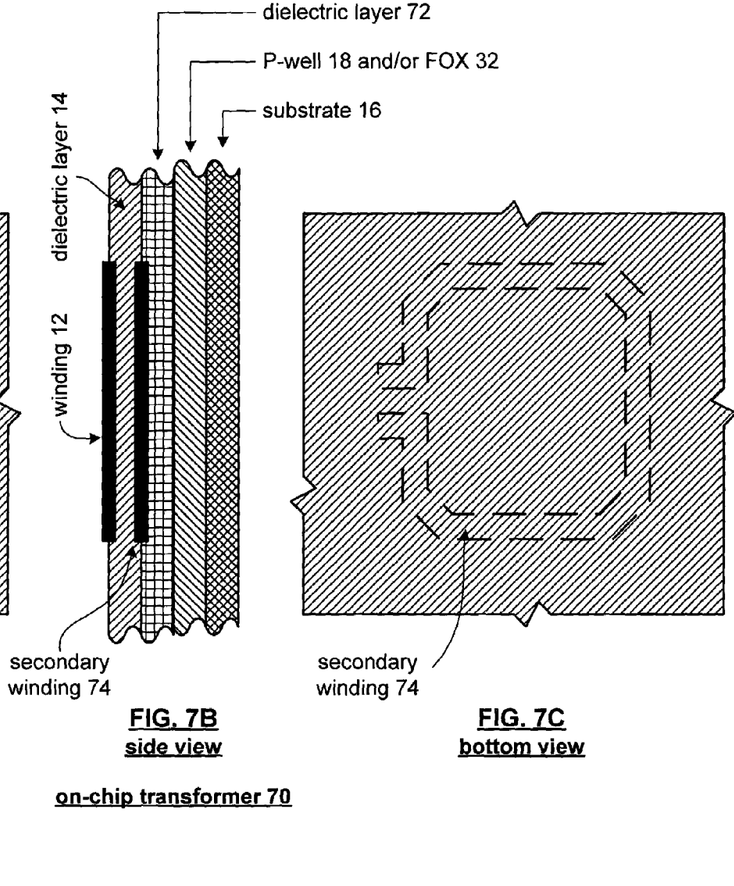

FIGS. 7A–7C illustrate an on-chip transformer 70 that includes winding 12 on dielectric layer 14, secondary windings 74 on dielectric layer 72 a P-well layer 18 and/or a field oxide layer 32 on substrate 16. The winding 12 may act as a primary winding for secondary winding 74. Each of the windings 12 and 74 may include multiple turns for dielectric layer and/or may include turns on multiple dielectric layers. The on-chip transformer 70 does not include a poly-silicon layer, which provides a poly-shield. As such, the quality factor of the windings 12 and 74 is increased in comparison to current on-chip inductors that include both a poly-shield and a P-well or field oxide layer.

Figure 8A:
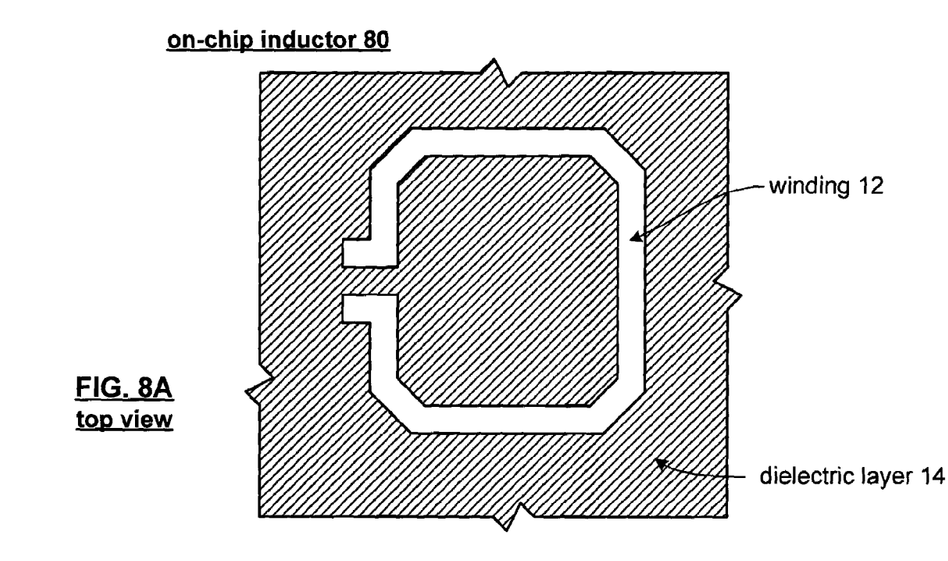
FIGS. 8A and 8B illustrate a still further embodiment of an on-chip inductor in accordance with the present invention.
Figure 8B:
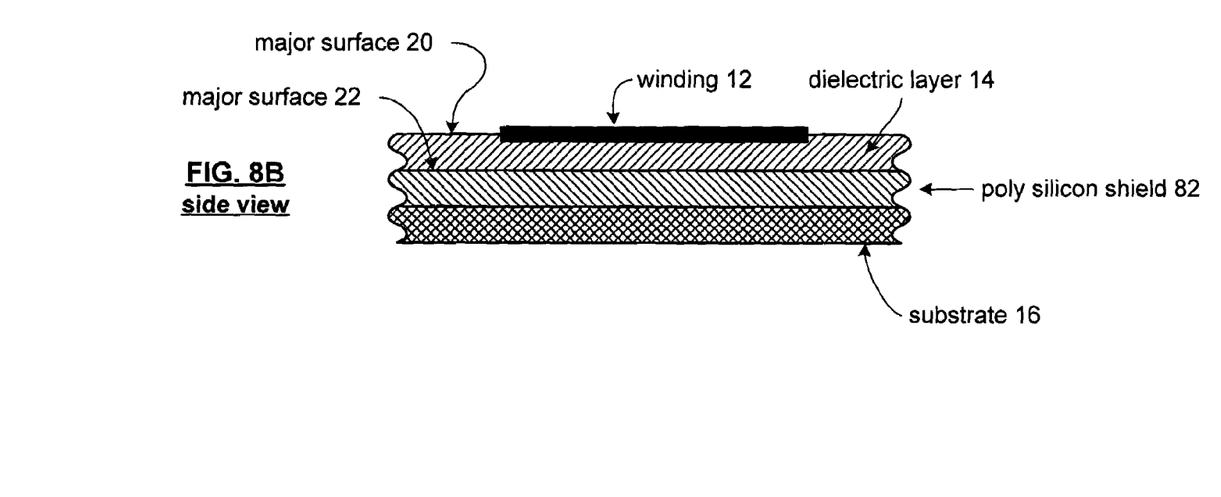

FIGS. 8A and 8B illustrate an on-chip inductor 80 that includes winding 12 on dielectric layer 14 and includes a poly-silicon shield 82 on substrate 16. In this embodiment, a field oxide layer and P-well layer are omitted. By including only a poly-silicon shield and not a P-well or field oxide layer, the quality factor, in comparison to including a poly-silicon with a P-well and/or with a field oxide layer is increased by 10–20%.

As one of average skill in the art will appreciate, the on-chip inductor 80 may have a multi-turn winding 12, may have winding 12 on multiple dielectric layers and/or may include a secondary winding to produce an on-chip transformer. In addition, the on-chip inductor 80 may include a center tap to produce a differential on-chip inductor.

Figure 9:
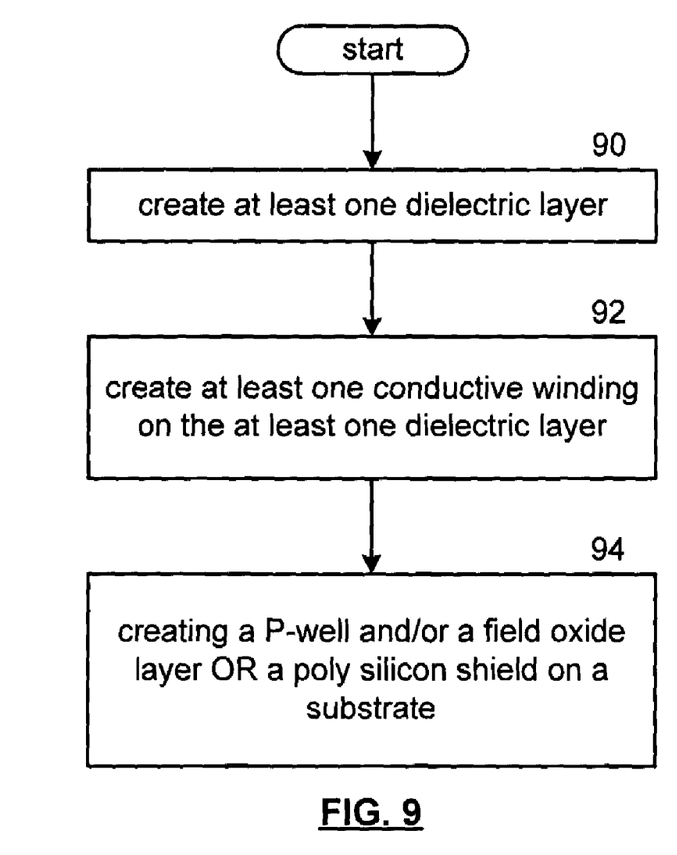
FIG. 9 illustrates a logic diagram of a method of manufacture of an on-chip inductor in accordance with the present invention.

FIG. 9 illustrates a logic diagram for manufacturing an on-chip inductor. The process begins at Step 90 where at least one dielectric layer is created on a substrate. The process then proceeds to Step 92 where at least one conductive winding is created on at least one dielectric layer. The conductive winding may include one or more turns on one or more dielectric layers to produce an on-chip inductor. In addition, the conductive winding may have a center tap to produce a differential inductor. In addition, a $2^{nd}$ conductive winding may be produced on a $2^{nd}$ dielectric layer to produce an on-chip transformer.

The process then proceeds to Step 94 where a P-well and/or a field oxide layer are created or a poly-silicon shield is created on a substrate. As such, the on-chip inductor will be created with a P-well layer and/or a field oxide layer exclusive of a poly-silicon shield or created with a poly-silicon shield exclusive of a P-well layer and a field oxide layer. As one of average skill in the art will appreciate, when multiple metal layers are fabricated, the fabrication process creates one dielectric layer, then a corresponding metal layer, which repeats for each metal layer desired. As one of average skill in the art will further appreciate, the fabrication steps may vary from the ones illustrated.

The preceding discussion has presented an on-chip inductor that has an improved quality factor and a method of manufacture thereof. By exclusively including a poly-silicon shield or a P-well and/or field oxide layer, the quality factor of on-chip inductors and on-chip transformers is improved. As one of average skill in the art will appreciate, other embodiments may be derived from the teachings of the present invention, without deviating from the scope of the claims.

What is claimed is:

1. A method for manufacturing an on-chip inductor consisting of:
   creating at least one dielectric layer;
   creating at least one conductive winding on the at least one dielectric layer; and
   creating a P-well having a major surface parallel to a major surface of the dielectric layer.

2. The method of claim 1 further consists of:

creating a field oxide having a major surface that is juxtaposed to the major surface of the P-well.

3. The method of claim 1 further consists of:

creating the at least one dielectric layer to include one layer; and creating the at least one conductive winding to include a spiral winding on the one layer.

4. The method of claim 1 further consists of:

creating the at least one dielectric layer to include a plurality of layers; and creating the at least one conductive winding to include a plurality of single windings on the plurality of layers.

5. The method of claim 1 further consists of:

creating the at least one dielectric layer to include a plurality of layers; and creating the at least conductive winding to include a plurality of spiral windings one the plurality of lagers.

6. The method of claim 1 further consists of:

creating a substrate having a major surface parallel to the major surface of the at least one dielectric layer.

7. The method of claim 1 further consists of:

creating a secondary winding magnetically coupled to the conductive winding.

8. The method of claim 1, wherein the at least one conductive winding further consists of:

creating a center tap operably coupled to a reference potential to produce a differential inductor.

* * * * *